United States Patent [19]

Kashiwabara et al.

[11] Patent Number: 5,292,288

[45] Date of Patent: Mar. 8, 1994

[54] SPEED-CHANGING HYDRAULIC OIL PRESSURE CONTROL APPARATUS FOR AN AUTOMATIC TRANSMISSION OF AN AUTOMOBILE

[75] Inventors: Masuo Kashiwabara; Yoshikazu Tanaka; Kazuki Kamada; Hideki Sekiguchi, all of Isesaki, Japan

[73] Assignee: Japan Electronic Control Systems Co., Ltd., Isesaki, Japan

[21] Appl. No.: 776,007

[22] PCT Filed: Apr. 5, 1991

[86] PCT No.: PCT/JP91/00457

§ 371 Date: Nov. 22, 1991

§ 102(e) Date: Nov. 22, 1991

[87] PCT Pub. No.: WO91/15689

PCT Pub. Date: Oct. 17, 1991

[30] Foreign Application Priority Data

Apr. 6, 1990 [JP] Japan .................................. 2-90431

[51] Int. Cl.⁵ .............................................. F16H 59/16
[52] U.S. Cl. ......................................... 475/63; 74/866
[58] Field of Search ....................... 74/866; 475/62, 63

[56] References Cited

U.S. PATENT DOCUMENTS

| | | | |
|---|---|---|---|
| 3,710,647 | 1/1973 | Dach et al. | 475/63 X |
| 3,738,193 | 6/1973 | Sumiyoshi et al. | 475/63 |
| 3,752,011 | 8/1973 | Casey et al. | 475/63 |
| 3,765,211 | 10/1973 | Dach et al. | 475/63 X |
| 4,231,092 | 10/1980 | Grob et al. | 74/866 X |
| 4,485,443 | 11/1984 | Knodler et al. | 74/866 X |
| 4,753,135 | 6/1988 | Sotoyama et al. | 74/866 |
| 4,868,753 | 9/1989 | Mori | 74/866 |
| 5,188,005 | 2/1993 | Sankpal et al. | 74/866 |

FOREIGN PATENT DOCUMENTS 63-92861 4/1988 Japan .
1-69947 5/1989 Japan .
1-261559 10/1989 Japan .

*Primary Examiner*—Dirk Wright
*Attorney, Agent, or Firm*—Foley & Lardner

[57] ABSTRACT

A speed-changing hydraulic oil pressure control apparatus for controlling speed-changing hydraulic oil pressure according to a transition state of the speed change in an automatic transmission. The controllability is improved by detecting in advance the transfer from a torque phase to an inertia phase by detecting the output torque of the transmission and the input revolution number and output revolution number of a torque converter. The input torque of the transmission is estimated from the input revolution number and output revolution number of the torque converter, and the transition state of the speed change is detected from the input torque and output torque of the transmission. By comparing input torque and output torque of the transmission, the transfer from the torque phase to the inertia passe is detected in advance by utilizing the phenomenon of a large fall of the output torque of the transmission just before the transfer to the inertia phase from the torque phase.

3 Claims, 4 Drawing Sheets

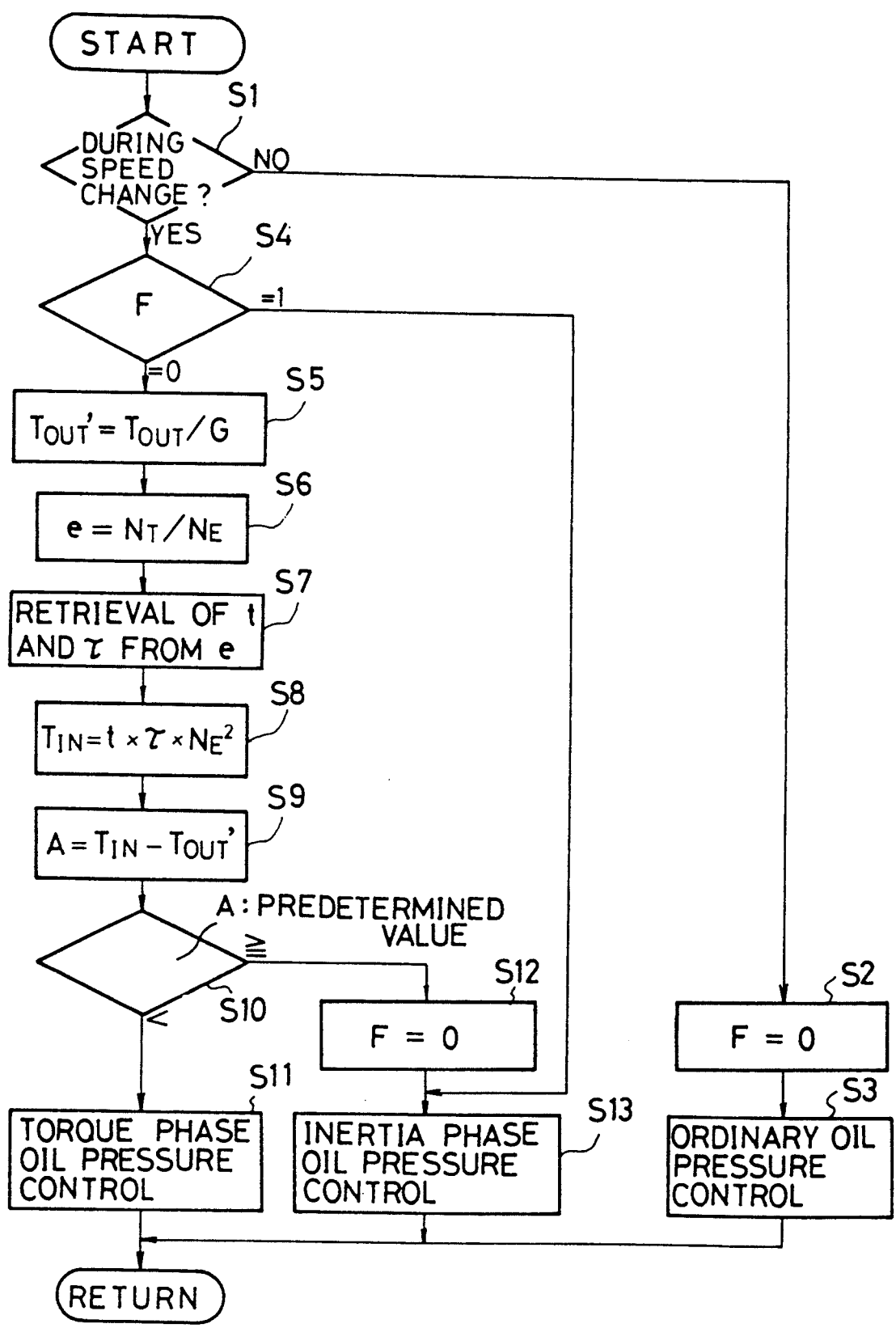

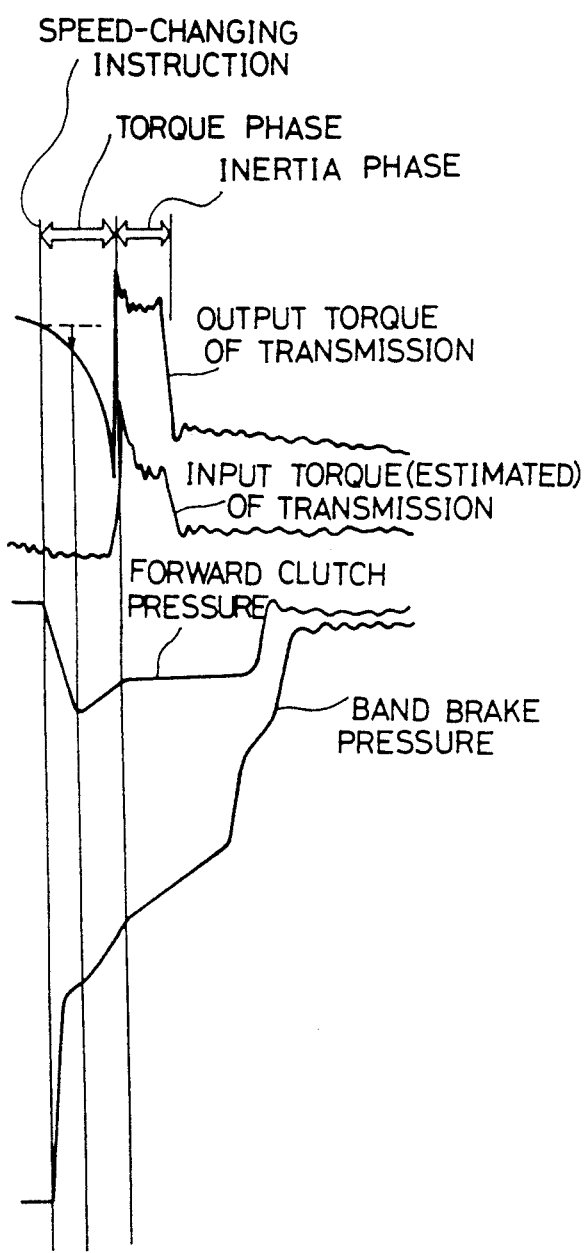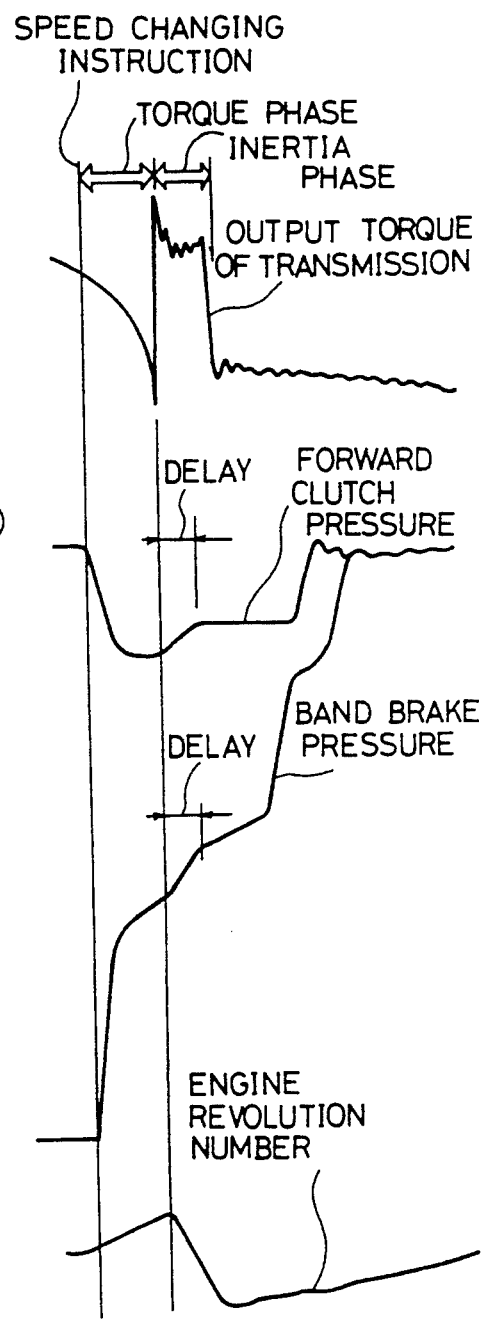

SPEED-CHANGING HYDRAULIC OIL PRESSURE CONTROL APPARATUS FOR AN AUTOMATIC TRANSMISSION OF AN AUTOMOBILE

TECHNICAL FIELD

The present invention relates to a speed-changing hydraulic oil pressure control apparatus of an automatic transmission for an automobile.

BACKGROUND ART

In an automatic transmission for an automobile, the output of an engine is input in a gear type transmission through a torque converter, and in the gear type transmission, the speed is changed by coupling and disconnection of transmission elements such as a clutch and a band brake.

For example, in the case where the speed is changed to the second speed from the first speed, a shift valve is changed over by a speed-changing instruction to increase the band brake pressure above a predetermined value and bring about a torque phase (the state where one pair of friction elements slip but the other pair of friction elements are completely engaged with each other). Then, the band brake pressure is further increased to transfer the torque phase to an inertia phase (the state where both of the two pairs of friction elements slip) causing a change of revolution (see FIG. 6).

At the detection of the timing of the speed change, the transfer of the phase to the inertia phase from the torque phase is detected by the start of falling of the revolution of the engine, and the hydraulic oil pressure is changed and controlled so that an optimum value of hydraulic oil pressure is obtained for each phase.

However, in this conventional apparatus, since the transfer of the phase to the inertia phase from the torque phase is detected by the start of falling of revolution of the engine and the control is performed based on the result of the detection, a problem of a delay of the response of the oil pressure arises, and the oil pressure is not changed immediately at the transfer of the phase to the inertia phase from the torque phase and the controllability is very low.

Under this background, it is a primary object of the present invention to solve the above-mentioned problem and to detect the transient state of the speed change at a proper timing while taking the response delay of the hydraulic oil pressure into consideration.

SUMMARY

In accordance with the present invention, there is provided a speed-changing hydraulic oil pressure control apparatus of an automatic transmission for an automobile, comprising a gear type transmission connected to an output shaft of an engine through a torque converter, where the transition state of the speed change is detected to control the hydraulic oil pressure of speed-changing elements in the transmission, said apparatus being comprising (a) means for detecting the output torque of the transmission, (b) means for detecting the input revolution number of the torque converter, (c) means for detecting the output revolution number of the torque converter, (d) means for estimating the input torque of the transmission from said input revolution number and output revolution number, and (e) means for detecting the transition state of the speed change from said input torque and said output torque.

The reasons for the adoption of the above-mentioned structure will now be described.

The output torque of the transmission greatly decreases from the point just before the transfer to the inertia phase from the torque phase, but such decrease is not caused in the input torque of the transmission estimated from the input revolution number and output revolution number of the torque converter. Accordingly, by comparing the input torque and output torque of the transmission, the transfer to the torque phase from the inertia phase can be detected in advance. Therefore, if the control is performed based on the result of this detection, the response delay of the hydraulic oil pressure can be sufficiently cancelled.

The transmission input torque-estimating means can be constructed by means for computing the speed ratio e of the output revolution number, or speed, Nt of the torque converter to input revolution number, or speed, Ne of the torque converter ($e = Nt/Ne$), means for retrieving predetermined torque ratio t and torque capacity coefficient $\tau$ according to the above-mentioned speed ratio e, and means for computing the transmission input torque, $Tin = t \times \tau \times Ne^2$, based on the above-mentioned input revolution number Ne, torque ratio t and torque capacity coefficient $\tau$.

Furthermore, the speed change transition state-detecting means can be constructed by means for computing the torque difference between the input torque Tin and output torque Tout of the transmission, and means for comparing the computed torque difference with a predetermined value and judging the phase as the torque phase when the computed value is smaller than the predetermined value of judging the phase as the inertia phase when the computed value is larger than the predetermined value. The torque difference-computing means can preferably be constructed so that after one of the input torque Tin and output torque Tout of the transmission has been corrected by the gear ratio, the torque difference is computed.

BRIEF DESCRIPTION OF THE DRAWINGS

FIG. 3 is a flow chart showing contents of the control in the embodiment shown in FIG. 2.

FIG. 5 is a diagram illustrating control characteristics of the present invention.

FIG. 6 is a diagram illustrating control characteristics of the conventional technique.

DETAILED DESCRIPTION OF THE PREFERRED EMBODIMENT

Figure 1:
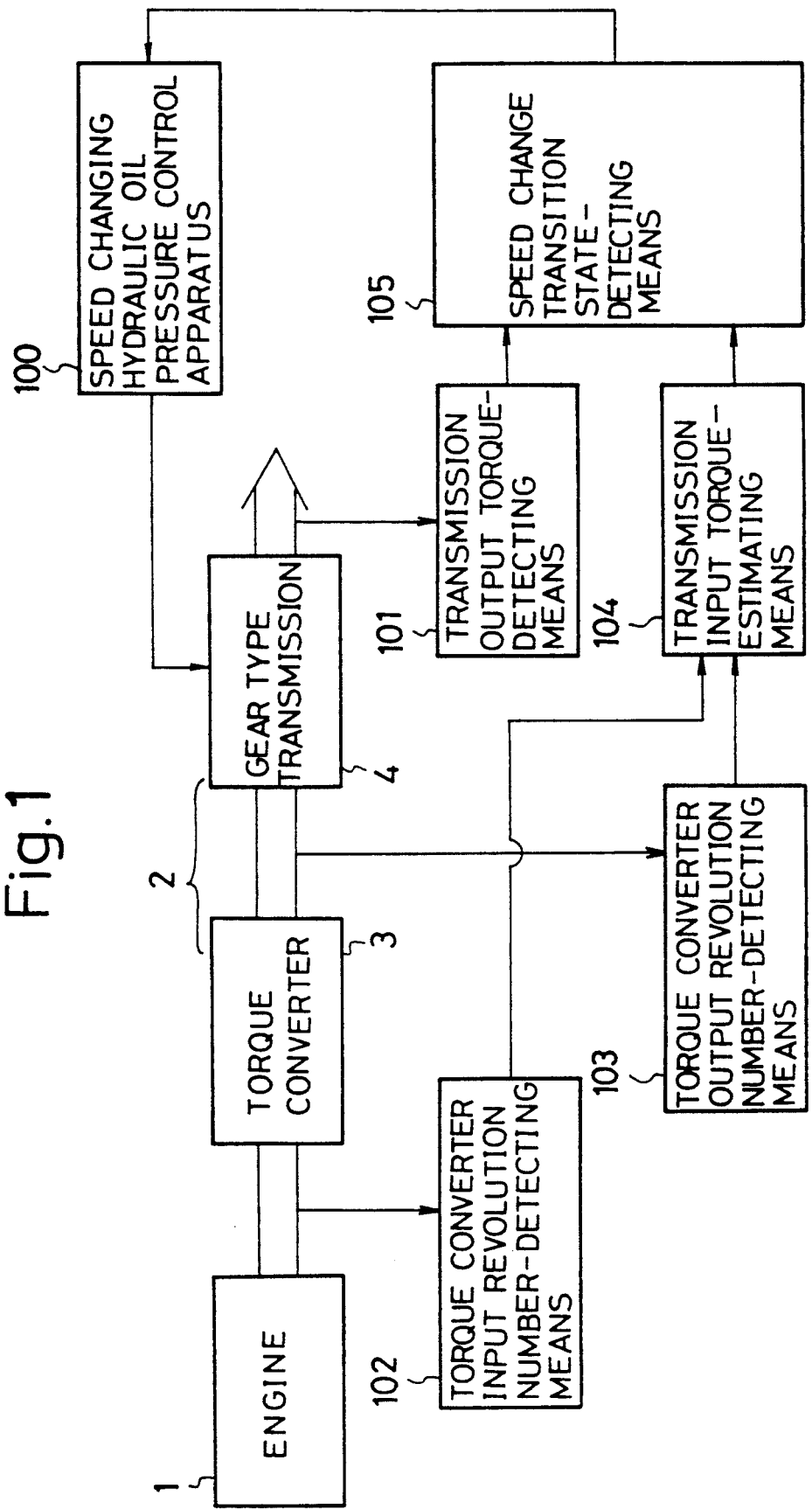
FIG. 1 is a block diagram illustrating the basic structure of the present invention.

FIG. 1 illustrates the basic structure of the present invention.

An automatic transmission 2 is disposed on the output side of an engine 1. The automatic transmission 2 comprises a torque converter 3 arranged on the output side of the engine 1 and a gear type transmission 4 connected through the torque converter 3. A hydraulic pressure for coupling and disconnecting speed-changing elements in the gear type transmission 4 is controlled by a speed-changing hydraulic oil pressure-controlling device 100.

The output torque Tout of the transmission 4 is detected by means 101 for detecting the output torque of the transmission. The input revolution number (engine revolution number, or speed, Ne of the torque converter 3 is detected by means 102 for detecting the input revolution number, or speed of the torque converter, and the output revolution number Nt of the torque converter 3 is detected by means 103 for the output revolution number of the torque converter 3.

Then, the input torque Tin of the transmission 4 is estimated from the input revolution number Ne and output revolution number Nt of the torque converter 3 and the torque converter characteristics by transmission input torque-estimating means 104.

Then, by speed change transition state-detecting means 105, the transition state of the speed change is detected from the input torque Tin and output torque Tout of the transmission 4. Namely, by comparing the input torque Tin and output torque Tout of the transmission 4, it is detected whether the phase is a torque phase or an inertia phase.

The signal of this detection is transmitted to the speed-changing hydraulic oil pressure-control device 100, and the hydraulic oil pressure of the speed-changing elements in the transmission 4 is controlled according to the transition state of the speed change.

One embodiment of the present invention will now be described in detail.

Figure 2:
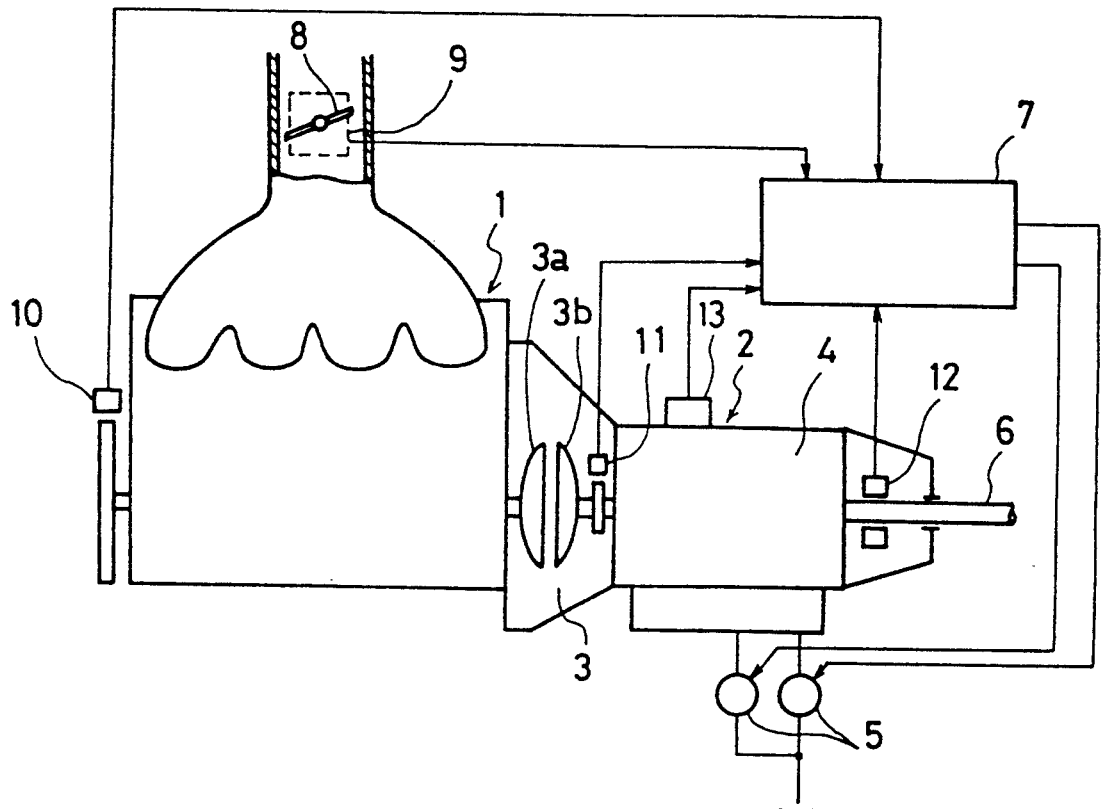
FIG. 2 is a system diagram illustrating one embodiment of the present invention.

Referring to FIG. 2 an automatic transmission 2 is disposed on the output side of an engine 1. The automatic transmission 2 comprises a torque converter 3 comprising a pump impeller 3a arranged on the output side of the engine 1 and turbine runner 3b, a gear type transmission 4 connected through this torque converter 3, and an electromagnetic valve 5 for controlling a hydraulic oil pressure to a hydraulic pressure actuator for coupling and disconnecting speed-changing elements, such as a forward clutch and a band brake, in this gear type transmission 4. Incidentally, reference numeral 6 represents an output shaft of the automatic transmission 2.

The electromagnetic valve 5 is duty-controlled by a control unit 7 having a microcomputer built therein.

Signals from various sensors are input in the control unit 7.

As one of the various sensor, there can be arranged a potentiometer type throttle sensor 9 for detecting the opening degree TVO of a throttle valve 8 of an suction system of the engine 1.

Furthermore, an engine revolution number sensor 10 is arranged to detect the engine revolution number Ne from the output shaft of the engine 1. The engine revolution number Ne is equal to the input revolution number of the torque converter 3 (the revolution number of the pump), and the engine revolution number sensor 10 corresponds to the torque converter input revolution number-detecting means.

Moreover, a torque converter output revolution number sensor 11 is arranged as the torque converter output revolution number-detecting means for detecting the output revolution number Nt of the torque convert 3 (the revolution number of the turbine).

Still further, a magnetostriction type torque sensor 12 is attached to the output shaft 6 of the gear type transmission 4 as the transmission output torque-detecting means for the output torque Tout. The magnetostriction type torque sensor is known, for example, from Japanese Unexamined Patent Publication No. 64-21255.

In addition, such informations as the gear ratio G detected based on the signal from a gear position sensor 13 are input into the control unit.

The control unit 7 controls the speed-changing hydraulic oil pressure according to the flow chart of FIG. 3.

At step 1 (each step is indicated by "S" in the drawings), it is judged whether or not the speed change is being carried out.

In the case where the speed change is not conducted, the routine goes into step 2 and an inertia phase-detecting flag F is reset. Then, the routine goes into step 3 and ordinary oil pressure control is carried out.

In the case where the speed change is conducted, the routine goes into step 4 and it is judged whether or not the inertia phase-detecting flag F rises. If the flag F does not still rise, the routine goes into step 5.

At step 5, the output torque Tout of the transmission 4 detected based on the signal from the torque sensor 12 is read in, but for comparison with the input torque Tin, described hereinafter, this output torque is divided by the gear ratio G and a comparison output torque Tout' ($=$Tout/G) is computed.

The engine revolution number Ne (torque converter input revolution number) detected based on the signal from the engine revolution number sensor 10 and the torque converter output revolution number Nt detected based on the signal from the torque converter output revolution number sensor 11 are read in at step 6, and the speed ratio e ($=$Nt/Ne) is computed.

Figure 4:
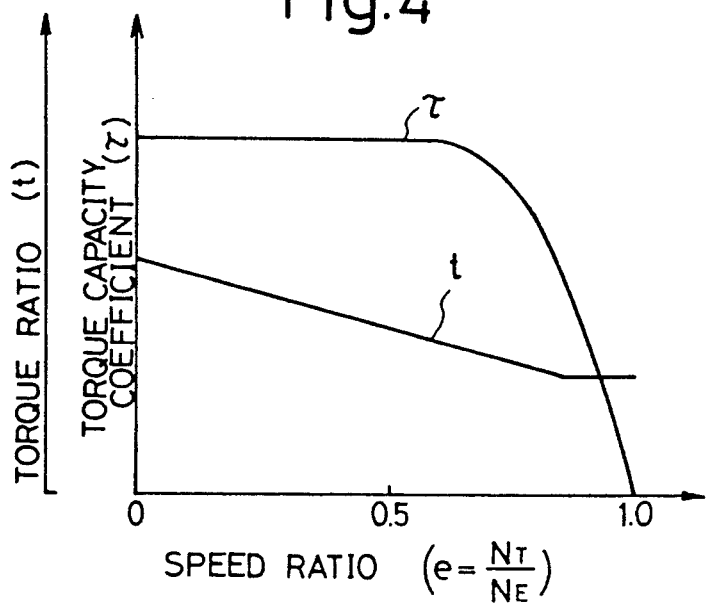
FIG. 4 is a diagram showing a map of torque converter characteristics used in the embodiment shown in FIG. 2.

At step 7, the torque ratio t and torque capacity coefficient $\tau$ are retrieved from the speed ratio e based on amp data corresponding to FIG. 4

At step 8, the input torque Tin of the transmission 4 is estimated according to the formula of Tin$=$t$\times\tau\times$Ne$^2$. The portion of steps 6 through 8 corresponds to the transmission input torque-estimating means. This input torque-estimating method is known, for example, from Japanese Unexamined Utility Model Publication No. 1-69947.

At step 9, the difference between the input torque Tin of the transmission 4 and the comparison output torque Tout' is calculated to determine a torque difference A ($=$Tin$-$Tout').

At step 10, the torque difference A is compared with a predetermined value. The portion of steps 9 and 10 corresponds to the speed change transition state-detecting means.

In the present embodiment, for computation of the torque difference A, the output torque Tout of the transmission 4 is corrected by the gear ratio G (Tout'$=$Tout/G). Instead of this method, however, there can be adopted a method in which the input torque Tin of the transmission 4 is corrected by the gear ratio G (Tin'$=$Tin$\times$G). Moreover, there can be adopted a method in which the torque difference A ($=$Tin$-$Tout) is determined without any correction, and the predetermined value for comparison is changed for each gear ratio G.

In the case where the torque difference A is smaller than the predetermined value, it is judged that the phase is a torque phase, and the routine goes into step 11 and the torque phase oil pressure control is carried out.

In the case where the difference A is equal to or larger than the predetermined value, it is judged that the phase has arrived at an inertia phase, and the routine goes into step 12 and the inertia phase-detecting flag F is set. Then, the inertia phase oil pressure control is carried out at step 13.

After the detection of the inertia phase, based on the judgement at step 4, the routine goes into step 13 so far as the speed is being changed, and the inertia phase oil pressure control is conducted.

Incidentally, at each of ordinary oil pressure control, torque phase oil pressure control and inertia phase oil pressure, the hydraulic oil pressure is determined based on the opening degree TVO of the throttle valve and the like while referring to a map, and the electromagnetic valve 5 is duty-controlled. Different maps are used of these controls, respectively.

For example, in the case where instructions of changing the speed to the second speed from the first speed are given, as shown in FIG. 5, the band brake pressure is reduced below the predetermined value by the speed change instructions to produce the torque phase, and then, the transfer to the inertia phase is detected in advance by the fall of the transmission output torque and the band brake pressure can be increased. Namely, the control can be effected in advance for the cancellation of the response delay of the hydraulic oil pressure.

In contrast, in the case where the transfer from the torque phase to the inertia phase is detected by the start of the fall of revolution of the engine and the hydraulic oil pressure is changed and controlled as in the conventional technique, as shown in FIG. 6, a problem of the response delay of the hydraulic oil pressure arises and the hydraulic oil pressure is not changed just in response to the transfer to the inertia phase from the torque phase, with the result that the controllability is degraded.

As is apparent from the foregoing description, according to the present invention, the transfer to the inertia phase from the torque phase is detected ahead of time and the control can be performed while taking the response delay of the hydraulic oil pressure into consideration, and there can be attained an effect of improving the controllability.

According to the present invention, in the control of a speed-changing hydraulic oil pressure at the time of the speed change in an automatic transmission for an automobile, the transfer to the inertia phase from the torque phase is detected ahead of time and the controllability of the automatic transmission can be improved, and the present invention has a great industrial applicability.

What is claimed is:

1. A speed-changing hydraulic oil pressure control apparatus for an automatic transmission of an automobile having a gear-type transmission connected to an output shaft of an engine through a torque converter, said apparatus comprising means for detecting output torque Tout of the transmission, means for detecting the input revolution number Ne of the torque converter, means for detecting the output revolution number Nt of the torque converter, means for estimating the input torque Tin of the transmission from said input revolution number and output revolution number, and means for detecting the transition state of the speed change from said input torque and said output torque for controlling hydraulic oil pressure of speed-changing elements in the transmission, wherein the speed change transition state-detecting means comprises means for computing the torque difference between the input torque Tin and output torque Tout of the transmission, and means for comparing the computed torque difference with a predetermined value and judging the phase as the torque phase when the computed value is smaller than the predetermined value or judging the phase as the inertia phase when the computed value is larger than the predetermined value.

2. A speed-changing hydraulic oil pressure control apparatus of an automatic transmission according to claim 1, wherein the transmission torque-estimating means comprises means for computing the speed ratio e of the output revolution number Nt of the torque converter to the input revolution number Ne of the torque converter (e=Nt/Ne), means for retrieving predetermined torque ratio t and torque capacity coefficient $\tau$ according to said speed ratio e, and means for computing the transmission input torque, $Tin = t \times \tau \times Ne^2$, based on said input revolution number Ne, torque ratio t and torque capacity coefficient $\tau$.

3. A speed-changing hydraulic oil pressure control apparatus according to claim 1, wherein the torque difference-computing means computes the torque difference after correcting one of the input torque Tin and output torque Tout of the transmission by the gear ratio.

* * * * *